(12) United States Patent
Soulie

(10) Patent No.: US 9,451,420 B2
(45) Date of Patent: Sep. 20, 2016

(54) DATA PROCESSING METHOD, IN AN AD HOC RADIO COMMUNICATION NETWORK, RADIO COMMUNICATION STATIONS AND CORRESPONDING COMPUTER PROGRAMS

(71) Applicant: THALES, Neuilly sur Seine (FR)

(72) Inventor: Antoine Soulie, Gennevilliers (FR)

(73) Assignee: THALES, Neuilly sur Seine (FR)

( * ) Notice: Subject to any disclaimer, the term of this patent is extended or adjusted under 35 U.S.C. 154(b) by 9 days.

(21) Appl. No.: 14/452,630

(22) Filed: Aug. 6, 2014

(65) Prior Publication Data

US 2015/0045080 A1 Feb. 12, 2015

(30) Foreign Application Priority Data

Aug. 7, 2013 (FR) ...................... 13 01900

(51) Int. Cl.
| | | |
|---|---|---|
| *H04B 7/185* | (2006.01) | |
| *H04W 4/08* | (2009.01) | |
| *H04W 8/26* | (2009.01) | |
| *H04L 29/12* | (2006.01) | |
| *H04L 12/18* | (2006.01) | |
| *H04W 84/18* | (2009.01) | |

(52) U.S. Cl.
CPC ............ *H04W 4/08* (2013.01); *H04L 12/185* (2013.01); *H04L 61/2069* (2013.01); *H04W 8/26* (2013.01); *H04W 84/18* (2013.01)

(58) Field of Classification Search
CPC ... H04L 61/10; H04L 12/185; H04L 61/106; H04L 65/1006; H04L 65/4061; H04L 65/4076; H04L 9/0833; H04W 4/08; H04B 7/14

USPC .......................................... 455/11.1, 13.1, 15
See application file for complete search history.

(56) References Cited

U.S. PATENT DOCUMENTS

| | | |
|---|---|---|
| 2006/0154598 A1 | 7/2006 | Rudland et al. |
| 2009/0303902 A1* | 12/2009 | Liu ....................... H04L 12/189 370/254 |
| 2010/0272105 A1 | 10/2010 | Li et al. |

OTHER PUBLICATIONS

French Search Report dated May 26, 2014, which issued during prosecution of French Application No. 1301900, which corresponds to the present application.
French Written Opinion dated Aug. 7, 2013, which issued during prosecution of French Application No. 1301900, which corresponds to the present application.

* cited by examiner

*Primary Examiner* — Tu X Nguyen
(74) *Attorney, Agent, or Firm* — Troutman Sanders LLP

(57) ABSTRACT

A method for data processing, in an ad hoc radio communication network including a set of radio communication stations each forming a node of the ad hoc network, in order to create a group of stations, including the following steps: creating by a first station of a first message indicating the network address of the group and the network addresses of the stations in the group; transmitting from all of the stations in the ad hoc network, the said first message; upon receipt of the said first message by the said station, each station: records in a lookup correlation-mapping table, the network address of the group in correlation with the network addresses of the stations in the group; and if the network address of the said station is present among the network addresses of the stations in the group, records the network address of the group indicated in the first message as the group address of the said station.

7 Claims, 3 Drawing Sheets

DATA PROCESSING METHOD, IN AN AD HOC RADIO COMMUNICATION NETWORK, RADIO COMMUNICATION STATIONS AND CORRESPONDING COMPUTER PROGRAMS

CROSS-REFERENCE TO RELATED APPLICATIONS

The present application claims priority to French Patent Application No. 13 01900 filed Aug. 7, 2013, which is herein incorporated by reference in its entirety.

FIELD OF THE INVENTION

The invention relates to a method for data processing, in an ad hoc radio communication network including a set of radio communication stations each forming a node of the ad hoc network, in order to create a group comprising of a subset of the said stations.

BACKGROUND

In a known manner, an ad hoc network has no fixed infrastructure. Radio communication stations, equipped with means for transmission and/or reception of radio signals and operating in accordance with appropriate protocols, form the nodes of the network and communicate with each other by means of a single radio channel or multiple shared radio channels.

An ad hoc network is in particular used to set in operation tactical communications between mobile military teams, for example, each provided with a radio communication station that constitutes a network node. Several teams are generally grouped together into groups, with the teams within a same given group being for example, part of a single hierarchical command structure.

There exist various different techniques for creating groups within radio communication networks.

A first known technique is referred to as "Multicast with IGMP Membership". The IGMP (abbreviation for "Internet Group Management Protocol") protocol used in IP (Internet Protocol) networks, allows a station to inform the stations it uses as relay stations, of its membership in one or more multicast groups.

Under this approach, the station, referred to as "source", of the creator of the group sends a request to each member of the group that they have created, requesting that this member establish an IGMP membership affiliation with the multicast address that has been communicated in their request.

Consider that the user from a source station wants to create a group including the source station and a plurality of other stations.

The source station referenced as "ss", includes an application block referenced as "s" in FIG. 1, for example the user's computer, and a radio frequency transmitting/receiving node, referenced as "ns."

Only one of the plurality of other stations, referenced as "sd", has been represented in FIG. 1. It also includes an application block referenced as "d" in FIG. 1, for example the users computer, and a radio frequency transmitting/receiving node, referenced as "na". Depending on the topology of the ad hoc network at the instant in time concerned, it is considered that there is a radio frequency transmitting/receiving node relaying data between the originating source station and the other station and referenced as nr.

A method for creation of a multicast group with IGMP membership implemented relatively to the station ss and to the station sd is represented in FIG. 1.

A first step 10 takes place between the application block s and the node ns, wherein, following a command from the application block s to the node ns for creation of a group network address, this network address, called "@mid", specific to the new group to be created, is provided to the application block s by the node ns: @mid=GetAddress( ).

Then the station ns, from the application block s, via the node ns, in a step 11, transmits a request to the station sd, via the relay node nr, and then via the node nd and forwarded to the application block d. This request reports the creation of a group to which the station sd belongs and requests for the station sd to establish an IGMP type membership affiliation with the group address indicated in the request.

This request is for example of the type JoinGroup(Gr Id, @d, @mid), where Gr Id is the name that identifies, at the application level, the group to be created with multicast network address @mid and @d is the address of the application block d.

Then, over the course of steps 12 13, 14, the implementation of the IGMP protocol makes it possible to set up membership affiliation associating the station sd, and then the relay node nr, with the multicast address @mid. Thus, in the step 12, an igmp(@mid, @d) message is transmitted to the node nd by the application block d. The latter thus informs the node nd that the address @mid is an address of a group to which the application block d belongs. This consequently results in all the messages sent to @mid having to be provided by the node nd to the application block d.

In the step 13, an igmp(@mid, @nd) message is transmitted to the relay node nr by the node nd. The latter thus informs the node nr that the messages sent to the address @mid should be transmitted to the node nd.

In the step 14, an igmp(@mid, @nr) message is transmitted to the node ns by the node nr. This latter thus informs the node ns that the messages sent to the address @mid should be transmitted by the node ns to the node nr.

The IGMP protocol thus creates a chain, or even a multicast tree, step by step, connecting the source and each member of the group. This chain or multicast tree, must be maintained by the network when the topology of the network is modified.

This process is in actual fact implemented relatively to the station ss and to each station of the plurality of other stations in the group.

Thus the establishment of a group according to this multicast with IGMP membership approach requires the sending of a message by the source to each member of the group, then the sending of membership affiliation messages over successive hops between each member and the source.

Thus for large sized groups (for example, with more than 50 members), the traffic load generated in the network and the time required for formation of the group, both of which depend on the number of members, are quite high.

Another known technique is called "Xcast". The group is explicitly constituted by a membership affiliation request message from the originating source that cites all of the members of the group and is sent to each of these members. The exchanges of messages between the members of the group subsequently take place by using the explicit addresses of all the members. For a group with a large number of members, the size of the header, which includes the destination field, of each message exchanged, is thus fairly significant, which thereby increases the load supported on the network.

This present invention is aimed at providing a solution that makes it possible to reduce the disadvantages of the techniques of the prior art and in particular offers the ability to dynamically create and maintain one or more groups of stations while also minimising the signalling, the time and volume of exchanges necessary.

SUMMARY

To this end, according to an aspect, the invention provides a method of the aforementioned type characterised in that it includes the following steps:

i/ creating by a first station of a first message indicating the network address of the group and the network addresses of the stations in the group;

ii/ transmitting from the said first station and to all of the stations in the ad hoc network, the said first message;

iii/ upon receipt of the said first message by the said station, the implementing by each station of the following steps:
  recording by the said station, in a lookup correlation-mapping table, of the network address of the group and performing a mapping between the said network address of the group indicated in the first message and the network addresses of the stations in the group indicated in the first message;
  determining whether the network address of the said station is present among the network addresses of the stations in the group indicated by the first message; and
  if the network address of the said station is determined to be present, recording, by the said station, of the network address of the group indicated in the first message as the group address of the said station.

In the embodiments, the method according to the invention further includes one or more of the following characteristic features:

It includes the following steps following the transmission over the network of a second message indicating the said group network address as the destination address of the said second message:
  receiving by a station, of the said second message transmitted;
  identification, by the said station, from the lookup correlation-mapping table of the said station, of the list of network addresses of stations in the group corresponding in the said table to the group network address indicated as the destination address of the message; and
  determining whether or not it is necessary to transmit the said second message by the said station, based on the identified list;
  if it is determined to be necessary for the said station to transmit the said second message, transmission, by the said station and with the said group network address as the destination address of the second message, of the said second message;

it further includes the following steps following the receipt by the said second station of the said message:
  determining, by the said station, whether the said group network address indicated as the destination address of the second message is a group address of the said station; and
  if the said group network address indicated is determined as being the group address of the said station, identifying an application module of the said station intended for processing the second message, depending upon the said second message; and provision of the content of the said second message to the application module identified;

it further includes a prior step of creation of the group of network address by the first station.

According to another aspect, the present invention provides a communication method implemented in a radio communication station constituting a node of an ad hoc radio communication network, during the creation of a group of stations by the said station, characterised in that it comprises the following steps:

i/ creating, by the said station, of a message indicating the network address of the group and the network addresses of stations in the group;

ii/ transmitting of the said message, from the said station, and to all of the stations in the ad hoc network.

According to a further aspect, the present invention provides a computer software program designed for a radio frequency transmitting/receiving station, adapted to form a node of a network, the said program comprising of instructions for implementing the steps of a method according to the second aspect of the invention during the execution of the program by the data processing means of the said station.

According to a yet further aspect, the present invention provides a radio communication station constituting a node of an ad hoc radio communication network, including a block for creating groups of stations, adapted for creating a message indicating the network address of a group of stations and the network addresses of the stations in the group and for transmitting to all of the stations in the ad hoc network, the said message.

According to yet another aspect, the present invention provides a communication method implemented in a first radio communication station constituting a node of an ad hoc radio communication network, in order to create a group comprising a subset of the radio communication stations of the ad hoc network, characterised in that it includes the following steps of:

receiving, by the first station, of a message indicating the network address of a group of stations and the network addresses of the stations in the group;
  recording, by the first station, in a lookup correlation-mapping table, of the network address of the group indicated in the message received and performing a mapping between the network address of the group and the network addresses of the stations in the group indicated in the received message;
  determining, for the first station, if the network address of the said first station is present in the received message; and
  if the network address of the said first station is determined to be present, recording, by the said first station, of the network address of the group indicated in the message as the group address of the said first station.

According to another aspect, the present invention provides a computer software program designed for a radio communication station, capable of forming a node of an ad hoc radio communication network, the said program comprising of instructions for implementing the steps of a method according to the fifth aspect of the invention during the execution of the program by the data processing means of the said.

According to a seventh aspect, the present invention provides a radio communication station constituting a node of an ad hoc radio communication network, including a block for creating groups of stations, adapted for receiving a message indicating the network address of a group of stations and the network addresses of the stations in the group, and for recording in a lookup correlation-mapping table, the network address of the group indicated in the message received and performing a mapping between the network address of the group and the network addresses of the stations in the group indicated in the received message, the said group creation block being further capable of determining whether the network address of the said station including the group creation block is present in the received message, and if the network address of the said station is indeed determined to be present, capable of recording the network address of the group indicated in the message as the group address of the said station including the group creation block.

BRIEF DESCRIPTION OF THE FIGURES

These characteristic features and advantages of the invention will become apparent from the following description, given by way of example and with reference being made to the accompanying drawings, wherein.

DETAILED DESCRIPTION

Figure 1:
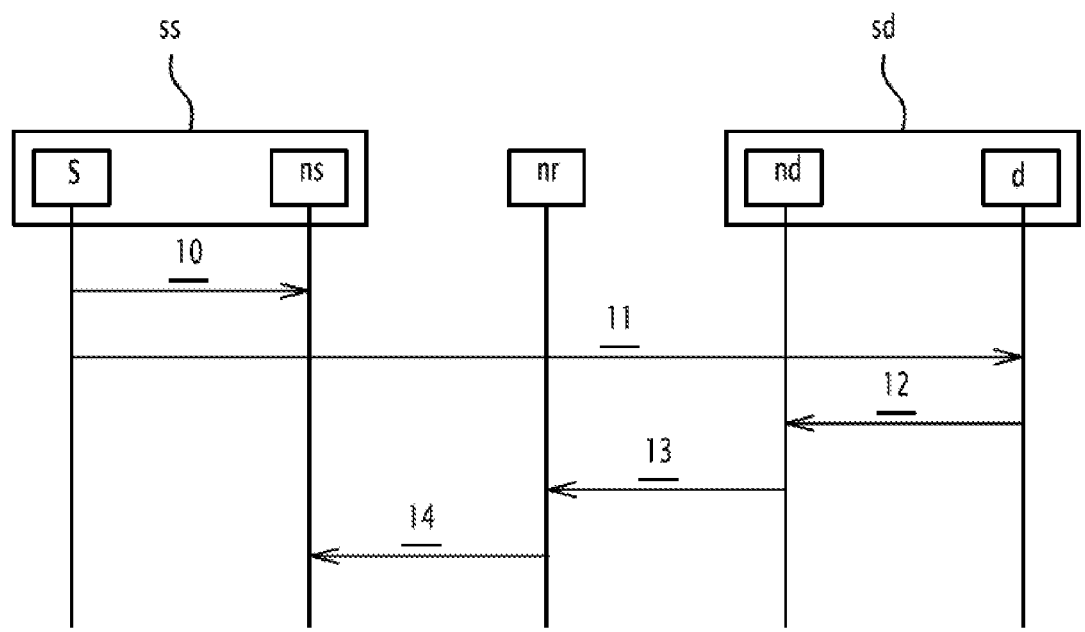
FIG. 1 shows a diagrammatic chronological representation of exchanges set in operation in order to create a group using an approach of the type: multicast with IGMP membership affiliation.

An ad hoc radio communication network 10 is shown in FIG. 1 The ad hoc network 10 includes a plurality of radio communication stations amongst which the stations Si, i=1 to 6; are shown.

In one example, at least some of the stations are mobile, which results in frequent changes in the topology of the network 10 and the routing tables of the stations.

Each radio communication station Si comprises a radio frequency transmitting/receiving block Ni connected to an antenna and adapted to form a node of the ad hoc network 10.

Each node includes for example an architecture made up of hardware layers 1 to 3 in the OSI model (abbreviation for Open Systems Interconnection).

By way of a reminder, the network addresses, which are for example IP based, are the addresses used by the nodes of the network for operations involving data routing to this address. Here below the network address of the station Si, also referred to hereinafter as network address of the node Ni, is referenced as @Ni, i=1 to 6.

In addition, some radio communication stations also include an application block including for example a suitable human/machine interface adapted for enabling interactions between the station and a user. For example, it is assumed here that at least the respective stations S1, S2, S3 each include an application block respectively A1, A2, A3. In one embodiment, the architecture of the application block Ai, i=1 to 3, comprises of layers among the upper layers 4 to 7 in the OSI model.

In the example considered, the application blocks A1, A2 and A3 further include an image processing module comprising of a display screen and a camera.

In one example, the stations include a memory storage and a small hand held micro programming unit. At least some of the treatment processes carried out in a station by the application block and/or by the node, and more generally by the station, in particular those described here below, are implemented following the execution, on the micro programming unit, of corresponding software instructions stored in the memory.

A routing table known as $T_R$, is in particular stored in the memory of each station, including routing elements developed based on the current state of the topology of the network and routing rules.

In the example of the invention considered here, a definition table for defining the groups in the network, named $T_{GPNet}$, is in addition stored in the memory of each station, in order to store therein the associations between the group network addresses and the addresses of their members as indicated here below.

And the memory of each station further includes a definition table for defining the groups belonging to the station, named $T_{GPloc}$, in order to store therein each group network address to which the station belongs, associated in one embodiment with the identifier of the group defined at the level of the application layer as indicated here below.

Each node 2 is capable of receiving, via the antenna, and processing, the radio frequency signals originating from a neighbouring node, and enabling the transmission of radio frequency signals by means of at least one shared radio channel. These radio signals carry data, such as signalling related information, data intended for the application blocks of stations or even data relating to the control (routing etc) of the network 10.

In one example, a node Ni is capable of scanning the shared radio channel in order to detect and receive a radio signal that is transmitted over the shared radio channel, and then to extract the network address or addresses indicated in the destination field of the inbound data carried by the radio signal received.

When the network address of the node Ni, or a group network address of a group to which the station Si belongs and is present in the table $T_{GPloc}$ of the node Ni, is featured in this destination field, the node Ni processes these data.

For each other node network address that appears in this destination field, the node Ni determines based on what is indicated for this other network address in its routing table $T_R$ whether the node Ni happens to be on the "optimal path" between the sender of the message as identified by their network address in the data sender field and this other destination network address. In the affirmative scenario, it relays the data received to the node in its radio neighborhood designated in its routing table $T_R$ as the next node on the optimal path to the destination network address. In the negative scenario, the node Ni does not relay the data on to the other node network address.

For each other group network address that appears in this destination field, the node Ni determines which ones are, in its table $T_{GPloc}$, the network addresses of the node(s) that are associated with this other group network address. Then the node Ni determines, based on what is indicated in its routing table $T_R$ for these node network addresses associated in the table $T_{GPloc}$ with this other group network address, whether it is on the "optimal path" between the sender of the message and one or more of the node network addresses associated in the table $T_{GPloc}$ with this other network address. In the affirmative scenario, it relays the data received to the node(s) in its radio neighborhood designated in its routing table $T_R$, as the node(s) immediately following the node Ni on the optimal path to that one/those among the node network addresses associated in the table $T_{GPloc}$ with this other group network address. In the negative scenario, it does not relay the data on to this other group network address.

The notion of "optimal path" is not necessarily the one corresponding to the smallest number of radio hops. The determination of the optimal path for getting from one node to another may take into account one or more criteria to be optimised, in addition to or instead of the number of radio hops, for example criteria related to load of network hops and/or capacities of hops (for example, links that do or do not enable the transmission of certain types of services, like voice telephony, video etc).

In one example, the radio frequency signals exchanged are in conformity with the IEEE 802.11 protocol or with the non standardised protocols in effect in the field of military radio communications, and include for example data related to video, voice communications, various types of messages like SMS (Short Message Service), MMS (Multimedia Messaging Service) and instant messaging.

Figure 2:
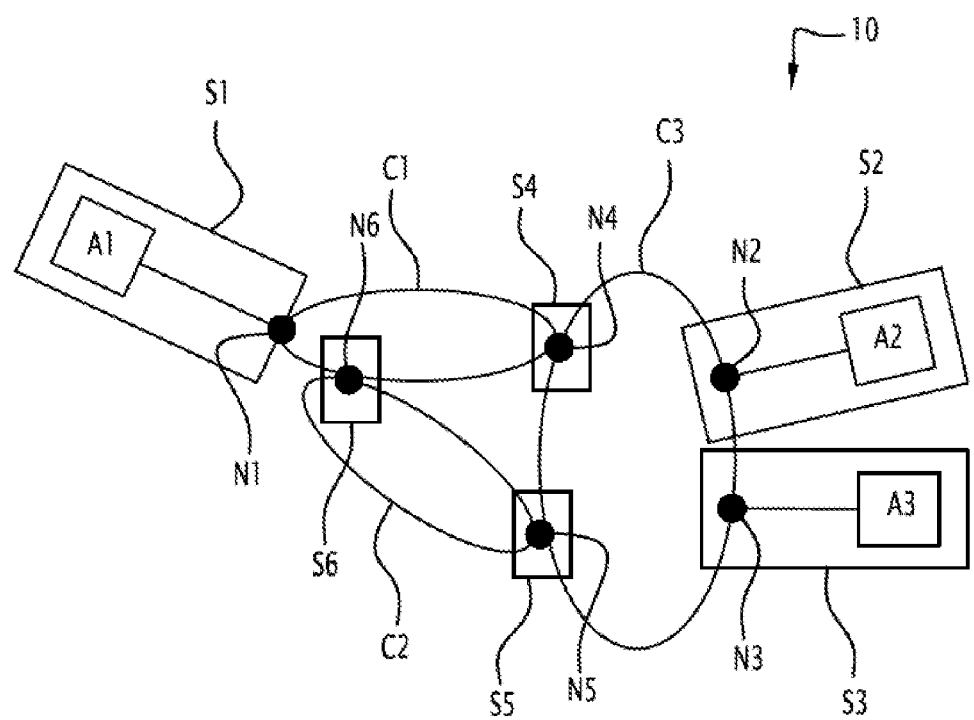
FIG. 2 shows an ad hoc network in an exemplary mode of implementation of the invention.

At the time instant considered with reference to FIG. 2, the nodes connected with each other by the same curve Cj, j=1 to 3 are within radio range of each other. Thus N1, N4 and N6 are within range of each other, like N2, N3, N4 and N5 or even N5 and N6.

Depending on the topology of the ad hoc network 10 at the time instant considered, it is considered that the station S4, including the radio frequency node N4, relays the data between the station S1 and the station S2 on the one hand, and that this station S4 in addition relays the data between the station S1 and the station S3.

Figure 3:
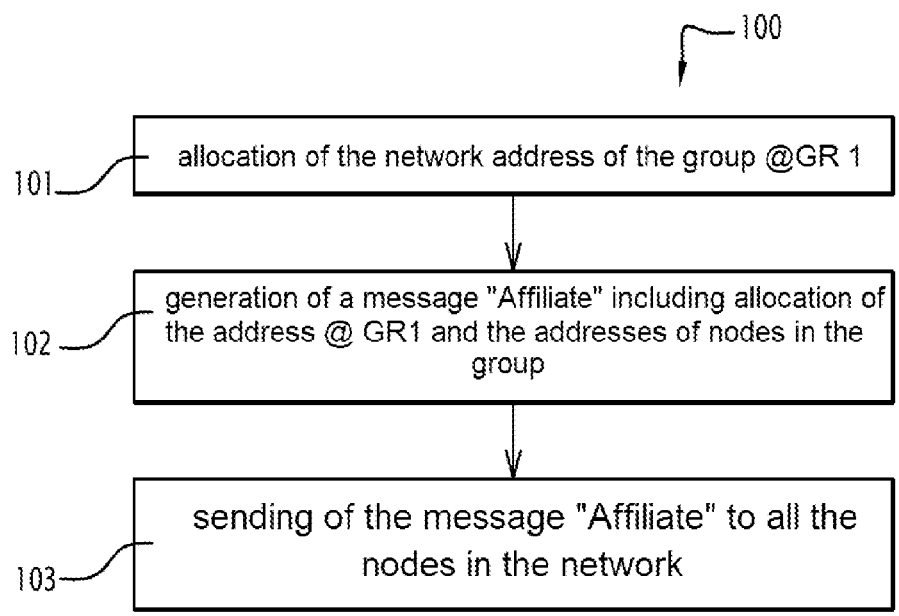
FIG. 3 shows the steps of a method in an exemplary mode of implementation of the invention.

The steps of a method 100 related to the creation of a group, in one example of the invention are described here below with reference made to FIG. 3.

A user of the station S1 executes a command for the creation of a group of stations, constituted by a subset of all of the stations on the network, in the case considered by the station S1, the station S2 and the station S3, via the human/machine interface of the application block A1, for example via a menu offering such a group creation option and allowing the user to define the name, here Grld1, which identifies the group at the application level, and to indicate the application identifiers, referenced as @A2; @A3 here below, of the members S2, S3 of the group.

In a step 101, following this command of the user from the station S1, a network address @GR1 is allocated by the station S1 for this group Gpld1. This step is for example implemented by means of the provision from the application block A1 to the node N1 of a command of the type JoinGroup (Gpld1; @A2, @A3).

Upon receipt of this command, the node N1 creates an IP address for this group, for example by implementing a function Mcast_alloc: @GR1=Mcast_alloc(Grld1). Then it determines the network address corresponding to the application identifiers @A2, @A3, for example by means of an Add function that provides the ability to find these addresses in a table storing the correlations between the application levels and network: @N2=Add(@A2) and @N3=Add (@A3.

Then, in a step 102, a message for declaring the group is generated by the station S1. This message includes, in the example considered:
    a name of the message type, here "Affiliate", indicating to the network that it is a group creation message,
    a field for declaring the network address allocated for the new group created, indicating here the address @GR1,
    a field for declaring the members of the group including the list of network addresses of the members of the group, here @N1, @N2, @N3, and
    a field for declaring the group name chosen, here Grld1.

Moreover, this message is preceded by a header including the destination field of the message Affiliate. The destination field indicates the flooding address of the network, @bcast thereby ensuring the broadcasting of the message to all the nodes in the network 10.

The message thus takes the following form: @bcast Affiliate [@GR1; (@N1; @N2; @N3); Grld1].

In a step 103, the message @bcast Affiliate [@GR1; (@N1; @N2; @N3); Grld1] is transmitted by the station S1 over the shared radio channel to all of the stations in the network 10.

In accordance with the flooding mechanism, the node that initiates the flooding sends the packet to all of its direct immediate neighbours: as well if any whichever network node receives the packet for the first time, it rebroadcasts it to all the neighbours. Thus step by step the packet floods the network.

Figure 4:
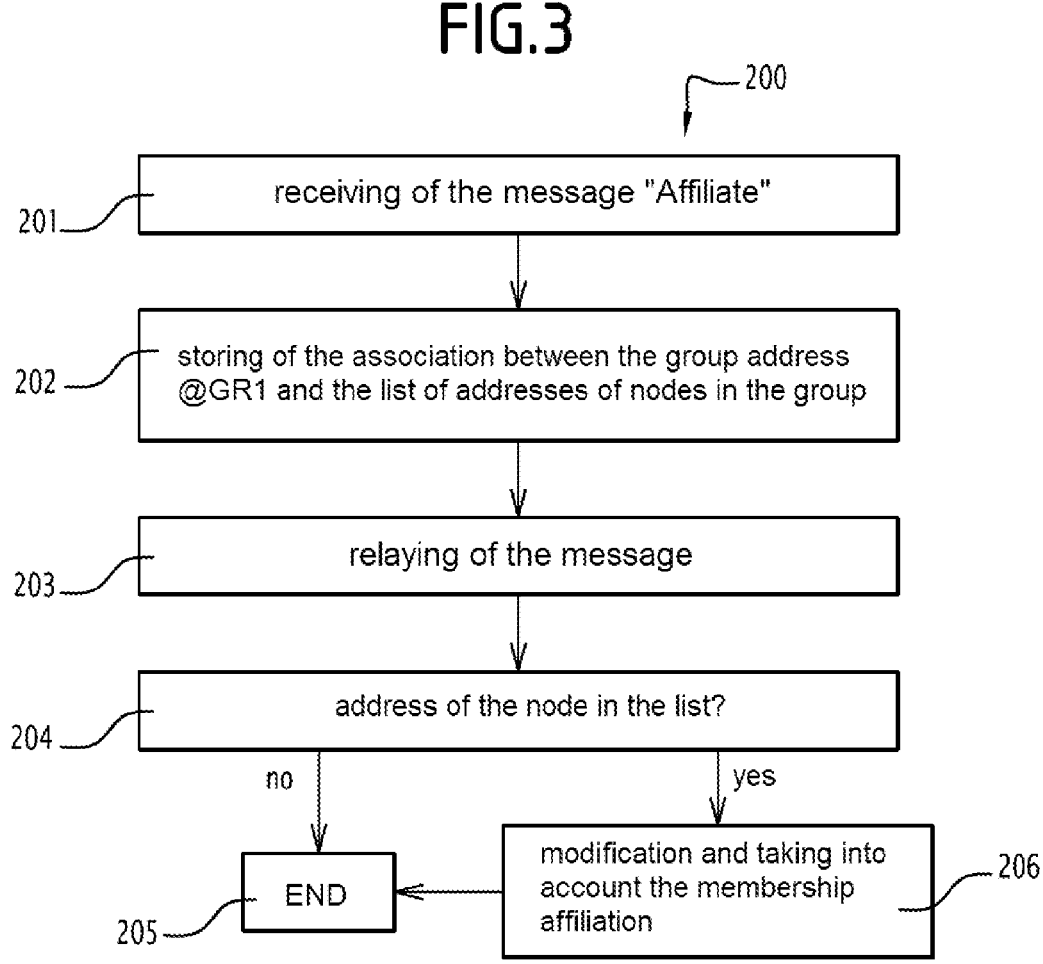
FIG. 4 shows the steps of a method in an exemplary mode of implementation of the invention.

A method 200 implemented by each station of the network Si, i=1 to 6, upon receiving the message Affiliate transmitted by the station S1 shall now be described with reference made to FIG. 4.

Thus, in a step 201, the station Si receives the message Affiliate and determines that the message is indeed addressed to it since the destination address is the flooding address of the network and processes it as described here below.

In a step 202, the station Si stores in its table $T_{GPNet}$ the association between the group network address @GR1 declared in the received message Affiliate and each of the network addresses of the members of the group as declared in the message Affiliate. Thus in the present case, it stores in its table $T_{GPNet}$ the association between @GR1 on the one hand and @N1, @N2 and @N3 respectively.

In one example, this association is established following the execution of a command link (@GR1, @N1, @N2, @N3) by the station Si.

The contents of this table $T_{GPNet}$ as updated will subsequently be used by the station Si when the data subsequently received are to be routed so as to be sent to the group network address GR1 indicated in the destination field of the data, as described farther below.

In a step 203, the station Si in its turn relays the message Affiliate that it has received to the stations of the network within radio proximity, in accordance with the flooding mechanism.

In a step 204, the station Si determines whether the network address @Ni of the station Si is present in the list of addresses of the members of the group indicated in the message Affiliate received.

In the negative scenario, that is to say, in the present case, for all i=4 to 6, the local process at the station of creation of the group with network address @GR1 is completed (step 205).

In the affirmative scenario, in a step 206, the operations for establishing membership affiliation with the new group with address @GR1 are implemented locally at the station Si. First of all, the station Si adds in its table $T_{GPloc}$ the network address @GR1 of the new group to which the station Si belongs, by associating therewith the application identifier Grld1 of the group as indicated in the message Affiliate.

In one example, a message is provided by the node Ni to the application block Ai, indicating the membership affiliation of the station Si to a new group and indicating in addition the application identifier, here Grld1, of the group. This first message is for example of the type JoinGroup (Grld1). Following the receipt of this message by the application block Ai, the latter for example results in the provision to the user of the station Si, via the human-machine interface, of the information reporting that the station Si has just established membership affiliation with the group having the identifier Grld1.

Then at the conclusion of step 206, the process is stopped (step 205).

The use by the station Si of the table $T_{GPloc}$ is as follows: at the time of receiving of data by the station Si, the address indicated in the destination field of the data is then compared by the station Si with the content of the addresses in the table $T_{GPloc}$ and if this address indicated is indeed equal to an address from the list $L_{GRloc}$, the station Si thus determines that the data received had indeed been sent to it and proceeds to processes the message as a consequence thereof.

Figure 5:
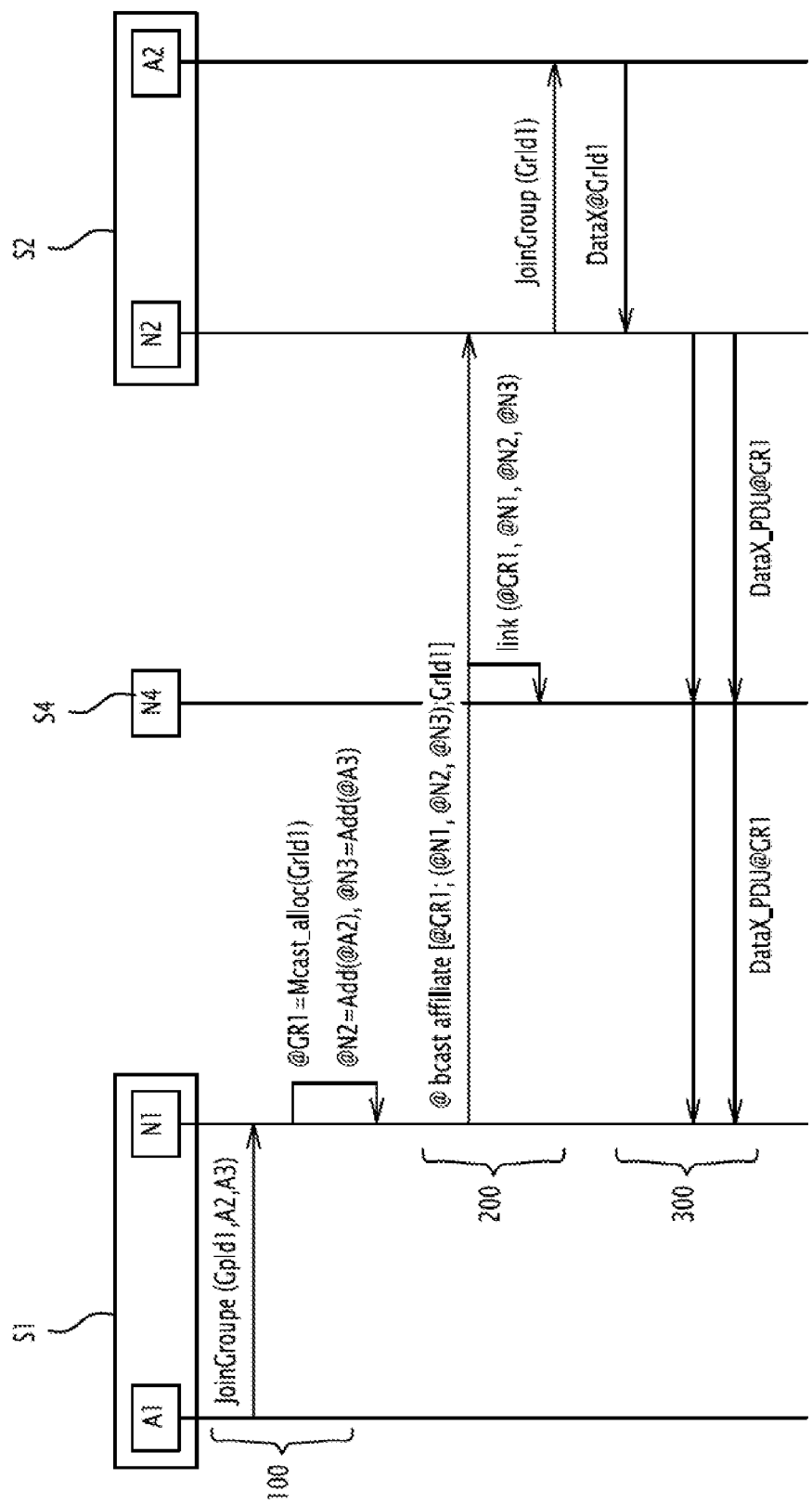
FIG. 5 shows a diagrammatic chronological representation of exchanges in an embodiment of the invention.

The main exchanges set in operation in the processes here above are shown in the diagrammatic chronological representation in FIG. 5 relative to the membership affiliation with the group Grld1 of the station S2 via the station S4 and from the station S1.

Thus the sending of a single Affiliate message to a member of the group makes it possible on the one hand to notify this member of its membership affiliation with a group, and on the other hand also provides the ability to construct the elements necessary to the routing by intermediate nodes, of future data to be exchanged in the group.

For illustration, in one example, it is subsequently considered that the user of the station S2 executes a command for the transmission of data to the group Grld1 (method 300).

These data are for example a DataX video data file captured using the camera of the application block A2. In order to do this, the user of the station S2, via the human-machine interface, selects the DataX data file and further indicates the identifier Grld1, for example by selecting in the application identifiers in the table $T_{GPloc}$.

Following this command of the user, the application block A2 transmits to the node N2 in a step 301, a corresponding command for the transmission of the DataX data to the group Grld1, for example in the form of the command DataX@Grld1.

The node N2 upon receiving this command, segments the DataX data file into multiple DataX_PDU packets, extracts from the table $T_{GRoc}$ of the station S2 the network address @GR1 of the group associated with the identifier Grld1, and indicates in the destination field of the packets this network Address @GR1.

The packets with fields thus appropriately populated DataX_PDU@GR1 are then sent over the network 10 in a step 302.

Each packet DataX_PDU@GR1 is received by the nodes N3, N4 and N5.

Each of these nodes Ni, i=3, 4 or 5 implements the following steps.

In a step 303, the destination network address @GR1 is first of all compared with the network address @Ni of the node Ni, and then with the group network addresses of the table $T_{GPloc}$ of the station Si.

If @GR1 is determined to be present in the table $T_{GPloc}$ (which is the case for i=3), the node Ni concludes therefrom that the station Si is indeed the intended receiver of the received packet DataX_PDU and provides it to the application block Ai for processing (in this present case, for example, so as to offer the user the display on the screen of the video file once all of the corresponding packets have been received).

In a step 304, whether the node Ni has or has not been determined to be the receiver in the step 303, the node Ni determines if it is a relay node for the transmission of data to the network address @GR1 and from the sender S2. To this end, it determines whether the address @GR1 is a group address stored in its table $T_{GPNet}$, and in the affirmative case, it extracts the network addresses of the members associated with @GR1 in the table $T_{GPNet}$ and determines, based on elements of its routing table $L_R$, the one(s), from these network addresses associated with @GR1, for which it is on the optimal path. If there are none of these, the node Ni does not relay the data packet DataX_PDU@GR1 (this is the case for N=5). Otherwise, the node relays the data packet (this is the case for i=4).

Following the data relaying thus performed by the node N4, the packet DataX_PDU@GR1 is then received by the node N1, which implements in its turn the steps of the method 300, resulting in the provision to the application block A1 of the data DataX of the video file as and when the various different DataX_PDU @GR1 packets are received.

The present invention thus provides the ability to establish a group with a multicast type address in a time that is independent of or hardly dependent on the number of members in the group on the one hand.

On the other hand, the messages exchanged in the group have a header size (including the recipient field) that is also independent of the number of members.

The steps of the methods according to the invention have been described here above with reference to the creation of a group. However, these steps are implemented in a similar manner for operations related to removal of a group created, or even to modification of a group created, including for example the removal or addition of a member, also including the constitution of a group from two other groups, by way of addition or exclusion etc.

In the embodiment considered, all of the JoinGroup and Affiliate messages leads to the creation of a group including the station S1 from which originates the Affiliate command. Another set of messages may also be taken into account according to the invention, wherein the station S1 is not a member of the group if the station S1 is not explicitly named in the field of the messages indicating the members of the group.

The invention claimed is:

1. A method for data processing, in an ad hoc radio communication network each forming a node of the ad hoc network, in order to create a group comprising of a subset of the said stations, the said method comprising the following steps:
   creating by a first station of a first message indicating the network address of the group and the network addresses of the stations in the group;
   transmitting from the said first station and to all of the stations in the ad hoc network, the said first message;
   implementing by each station of the following steps upon receipt of the said first message by the said station:
   recording by the said station, in a lookup correlation-mapping table, of the network address of the group and performing a mapping between the said network address of the group indicated in the first message and the network addresses of the stations in the group indicated in the first message;

determining whether the network address of the said station is present among the network addresses of the stations in the group indicated by the first message; and if the network address of the said station is determined to be present, recording, by the said station, of the network address of the group indicated in the first message as the group address of the said station.

2. The method according to claim 1, further comprising the following steps following the transmission over the network of a second message indicating the said group network address as the destination address of the said second message:

receiving by a station, of the said second message transmitted;

identification, by the said station, from the lookup correlation-mapping table of the said station, of the list of network addresses of stations in the group corresponding in the said table to the group network address indicated as the destination address of the message; and determining whether or not it is necessary to transmit the said second message by the said station, based on the identified list;

wherein if it is determined to be necessary for the said station to transmit the said second message, transmission, by the said station and with the said group network address as the destination address of the second message, of the said second message.

3. The method according to claim 2, further comprising the following steps following the receipt by the said second station of the said message:

determining, by the said station, whether the said group network address indicated as the destination address of the second message is a group address of the said station; and wherein if the said group network address indicated is determined as being the group address of the said station, identifying an application module of the said station intended for processing the second message, depending upon the said second message; and provision of the content of the said second message to the application module identified.

4. The method according to claim 1, further including a prior step of creation of the group of network address by the first station.

5. A communication method implemented in a first radio communication station constituting a node of an ad hoc radio communication network, in order to create a group comprising a subset of the radio communication stations of the ad hoc network, comprising the following steps of:

receiving, by the first station, of a message indicating the network address of a group of stations and the network addresses of the stations in the group;

recording, by the first station, in a lookup correlation-mapping table, of the network address of the group indicated in the message received and performing a mapping between the network address of the group and the network addresses of the stations in the group indicated in the received message;

determining, for the first station, if the network address of the said first station is present in the received message; and wherein if the network address of the said first station is determined to be present, recording, by the said first station, of the network address of the group indicated in the message as the group address of the said first station.

6. A non-transitory computer-readable medium including a computer software program designed for a radio communication station, capable of forming a node of an ad hoc radio communication network, the said program comprising of instructions for implementing the following steps during the execution of the program by the data processing unit of the said station, in order to create a group comprising a subset of the radio communication stations of the ad hoc network:

receiving, by the first station, of a message indicating the network address of a group of stations and the network addresses of the stations in the group;

recording, by the first station, in a lookup correlation-mapping table, of the network address of the group indicated in the message received and performing a mapping between the network address of the group and the network addresses of the stations in the group indicated in the received message;

determining, for the first station, if the network address of the said first station is present in the received message; and wherein if the network address of the said first station is determined to be present, recording, by the said first station, of the network address of the group indicated in the message as the group address of the said first station.

7. A radio communication station constituting a node of an ad hoc radio communication network, including a block for creating groups of stations, adapted for receiving a message indicating the network address of a group of stations and the network addresses of the stations in the group, and for recording in a mapping table, the network address of the group indicated in the message received and performing a mapping between the network address of the group and the network addresses of the stations in the group indicated in the received message, the said group creation block being further capable of determining whether the network address of the said station including the group creation block is present in the received message, and if the network address of the said station is indeed determined to be present, capable of recording the network address of the group indicated in the message as the group address of the said station including the group creation block.

* * * * *